(12) United States Patent
Hellmann et al.

(10) Patent No.: US 11,818,216 B2
(45) Date of Patent: Nov. 14, 2023

(54) NETWORK FOR DATA TRANSMISSION

(71) Applicant: Phoenix Contact GmbH & Co. KG, Blomberg (DE)

(72) Inventors: Klas Hellmann, Hameln (DE); Martin Mueller, Luegde (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 18/019,251

(22) PCT Filed: Aug. 2, 2021

(86) PCT No.: PCT/EP2021/071529
§ 371 (c)(1),
(2) Date: Feb. 2, 2023

(87) PCT Pub. No.: WO2022/029057
PCT Pub. Date: Feb. 10, 2022

(65) Prior Publication Data
US 2023/0231918 A1    Jul. 20, 2023

(30) Foreign Application Priority Data
Aug. 6, 2020   (LU) .................................. LU101975

(51) Int. Cl.
*H04L 67/12*   (2022.01)
*H04L 67/00*   (2022.01)
(52) U.S. Cl.
CPC .............. *H04L 67/12* (2013.01); *H04L 67/34* (2013.01)

(58) Field of Classification Search
CPC ................................. H04L 67/12; H04L 67/34
See application file for complete search history.

(56) References Cited

U.S. PATENT DOCUMENTS

2018/0309831 A1   10/2018  Sherman
2019/0268311 A1*   8/2019  Mihai ................. H04L 63/0209

FOREIGN PATENT DOCUMENTS

EP           2755097 A2     7/2014

* cited by examiner

*Primary Examiner* — Jason D Recek
(74) *Attorney, Agent, or Firm* — LEYDIG, VOIT & MAYER, LTD.

(57) ABSTRACT

A network for data transmission, in particular in automation technology, includes: a) a plurality of terminals, b) a common gateway for external connection of the network with the plurality of terminals to an external data transmission network, c) data connections between the common gateway and individual terminals of the plurality of terminals, and d) a plurality of OPC-UA servers. One of the plurality of OPC-UA servers is in each case assigned to the individual terminals, and individual OPC-UA servers communicate with corresponding terminals so that the individual terminals are addressable by the external data transmission network according to OPC-UA. A software component, which creates one of the OPC-UA servers, is in each case stored in the individual terminals. The common gateway loads the software components for creating the individual OPC-UA servers from the terminals and executes them in the common gateway.

8 Claims, 4 Drawing Sheets

NETWORK FOR DATA TRANSMISSION

CROSS-REFERENCE TO PRIOR APPLICATIONS

This application is a U.S. National Phase application under 35 U.S.C. § 371 of International Application No. PCT/EP2021/071529, filed on Aug. 2, 2021, and claims benefit to Luxembourg Patent Application No. LU 101975, filed on Aug. 6, 2020. The International Application was published in German on Feb. 10, 2022 as WO2022/029057 under PCT Article 21(2).

FIELD

The invention relates to a network for data transmission, in particular in automation technology.

BACKGROUND

A standard is known in the prior art by the name of OPC Unified Architecture (OPC-UA) for data exchange as platform-independent architecture (OPC: Open Platform Communications), which is also used in the field of automation technology in order to provide for a data exchange between all terminals (sensors and actuators) in automation technology. OPC-UA is thus no longer used exclusively for the transmission of data in superposed systems (e.g., via edge gateway to the cloud), but also for the exchange of data between controllers and terminals (sensors and actuators), which currently often communicate with one another via corresponding Ethernet-based protocols (e.g. Profinet, Modbus TCP, EtherCAT, etc.).

However, there are two key challenges when using OPC-UA in automation technology. On the one hand, today's terminals (sensors and actuators) do not have a suitable interface. On the other hand, the known terminals (sensors and actuators) do not yet have consistently sufficient computing power in order to operate a corresponding OPC-UA server. The known terminals can thus not be addressed directly via OPC-UA.

Suitable gateways, which provide for external access to conventional terminals (sensors and actuators) via OPC-UA can be used to solve this problem. For this purpose, the gateways contain an OPC-UA server, which then communicates with the individual terminals (sensors and actuators). The communication between the gateway and the individual terminals can then take place according to a conventional different standard (e.g. Profinet, Modbus TCP, EtherCAT, etc.), which is supported by the terminals.

FIG. 1 thus shows a conventional network of this type comprising several terminals 1-4, which can be sensors or actuators of the automation technology. The drawing further shows a gateway 5, which communicates with the individual terminals 1-4 via a respective data connection Link1-Link4, wherein the data connections Link1-Link4 do not operate according to OPC-UA, but according to a different conventional standard (e.g. Profinet, Modbus TCP, EtherCAT, etc.). The gateway 5 is connected to an external data transmission network 6, wherein the individual terminals 1-4 from the data transmission network 6 can also be addressed via OPC-UA. For this purpose, an OPC-UA server 7 is integrated into the gateway 5.

However, the fact that a completely transparent access to the individual terminals is not made possible because the data of the individual terminals are reached (or provided) at the IP address (IP: Internet Protocol) of the gateway 5, is a disadvantage of this technical solution.

To solve this technical problem, a slightly changed network is known (confer US 2018/0309831 A1), as illustrated in FIG. 2. This likewise known network largely corresponds to the above-described network illustrated in FIG. 1, so that, to avoid repetitions, reference is made to the above description, wherein the same reference numerals are used for corresponding details. A special feature of this known network is that an OPC-UA server 8-11 is in each case provided in the gateway 5 for each of the terminals 1-4. This provides for a completely transparent access from the external network 6 to the individual terminals 1-4 in an advantageous manner because one of the OPC-UA servers 8-11 is in each case assigned to each of the terminals 1-4.

The complex implementation of the individual OPC-UA servers 8-11 in the gateway 5 is a disadvantage of this known technical solution according to FIG. 2.

SUMMARY

In an embodiment, the present invention provides a network for data transmission, comprising: a) a plurality of terminals, b) a common gateway for external connection of the network with the plurality of terminals to an external data transmission network, c) data connections between the common gateway and individual terminals of the plurality of terminals, and d) a plurality of OPC-UA servers, wherein one of the plurality of OPC-UA servers is in each case assigned to the individual terminals, and individual OPC-UA servers communicate with corresponding terminals so that the individual terminals are addressable by the external data transmission network according to OPC-UA, e) wherein a software component, which is configured to create one of the OPC-UA servers, is in each case stored in the individual terminals, and f) wherein the common gateway loads the software components for creating the individual OPC-UA servers from the terminals and executes them in the common gateway.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
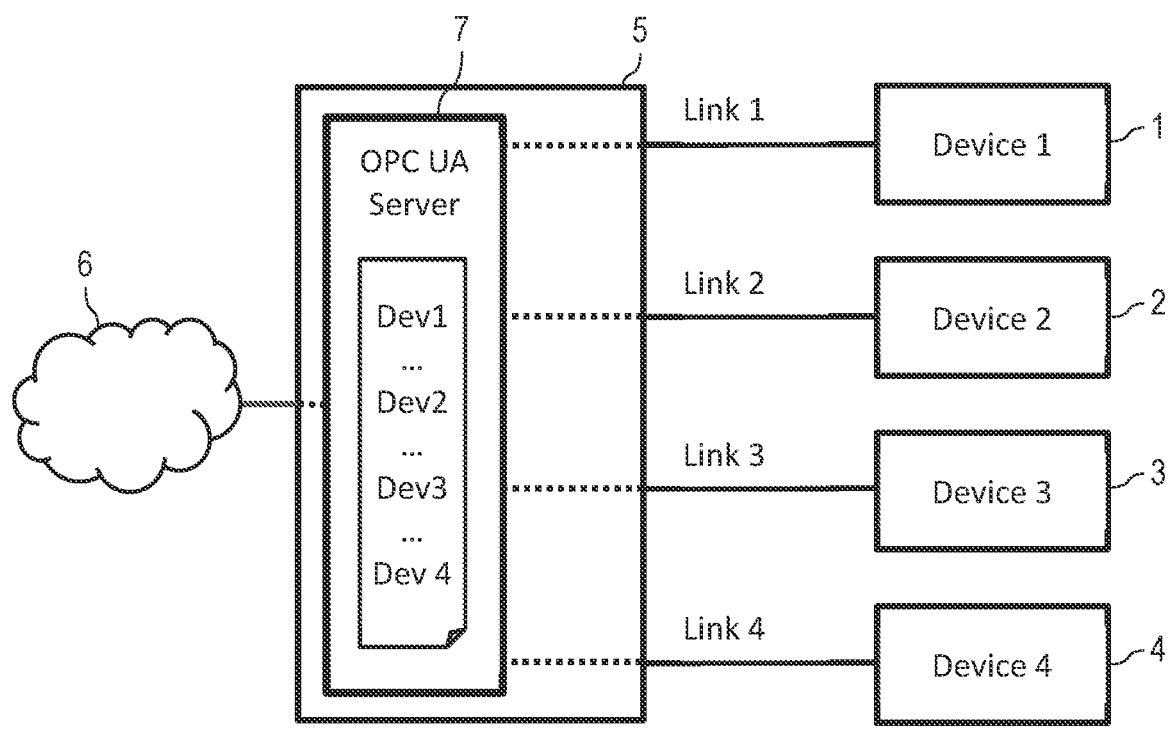
FIG. 1 shows a schematic illustration of a conventional network for data communication according to OPC-UA comprising a gateway comprising an integrated OPC-UA server.

In an embodiment, the present invention provides an improved network for data transmission.

The network according to the invention serves the purpose of data transmission, wherein the network is in particular suitable for a use in automation technology. However, with regard to the field of application of the network, the invention is not limited to automation technology.

In accordance with the above-described prior art, the network according to the invention likewise comprises several terminals, which can be, for example, sensors or actuators. However, with regard to the type of the individual terminals, the invention is not limited to sensors and actuators, as they can be used, for example, in automation technology.

In accordance with the above-described prior art, the network according to the invention furthermore comprises a common gateway, which provides for an external connection of the network with the terminals to an external data transmission network. The gateway thus provides for an external access to the individual terminals from the external data transmission network, as has already been described above with regard to the prior art.

In accordance with the prior art, the network according to the invention furthermore also has data connections between the gateway and the individual terminals, in order to provide for a communication between the gateway and the terminals.

The network according to the invention furthermore also has several OPC-UA servers, wherein one of the OPC-UA servers is in each case assigned to the individual terminals. The individual terminals thus communicate with the individual OPC-UA servers, so that the individual terminals can be addressed by the external data transmission network according to OPC-UA, namely with completely transparent access to the individual terminals.

It should be mentioned thereby that the application does not only describe a network, in the case of which an OPC-UA server is in each case assigned to all terminals at the gateway. On the contrary, it is also possible that further terminals, which are not addressed via OPC-UA and to which a separate OPC-UA server is thus also not assigned in the gateway, are also connected to the gateway. As part of the invention, it is furthermore also possible that terminals, which themselves are OPC-UA-capable and which contain a separate OPC-UA server, are connected to the gateway. An OPC-UA server thus also does not need to be provided in the gateway for these OPC-UA-capable terminals.

Compared to the prior art, the network according to the invention is now characterized in that a software component, which is suitable to form one of the OPC-UA servers, is in each case stored in the individual terminals. During operation, the gateway then loads the software components for forming the individual OPC-UA servers from the terminals and executes the software components in the gateway in order to form a respective OPC-UA server. The implementation of the OPC-UA servers in the gateway is simplified significantly by means of this technical solution according to the invention.

In the case of the preferred exemplary embodiment of the invention, a runtime element or an instance of the software component, respectively, is in each case assigned to each of the terminals (actuator or sensor), wherein the software component can also be referred to as app.

The gateway thus contains a suitable hardware, which, on the one hand, provides for the loading of the software component from the respective terminal and, on the other hand, the execution of the loaded software component in the gateway in order to form an OPC-UA software.

The individual terminals, in contrast, contain a suitable hardware in order to provide for the storing of the software component in the respective terminal on the one hand, and the transmission of the software component to the gateway on the other hand.

In a preferred exemplary embodiment of the invention, the gateway for communication with the individual terminals in each case has a port for the individual terminals. The gateway then loads the software component for forming the individual OPC-UA servers in a port-based manner, individually for each of the ports, so that one of the software components, which form an OPC-UA server, is in each case assigned to each of the ports of the gateway.

It should furthermore be mentioned that in the case of the preferred exemplary embodiment, the individual terminals are in each case TCP-IP-capable (TCP-IP: Transmission Control Protocol/Internet Protocol). With regard to the transmission standard, however, which is supported by the individual terminals, the invention is not limited to TCP-IP-capable terminals. In the context of the invention, in contrast, the individual terminals can generally also support other transmission standards.

For example, the individual terminals for communication with the assigned OPC-UA servers can in each case have one of the following data interfaces:
Ethernet,
I/O link according to EN 61131,
Highway Addressable Remote Transducer (HART).

An advantage of the solution according to the invention is in particular that the individual OPC-UA servers can in each case have a separate IP address in order to provide for a direct and completely transparent access from the external data transmission network to the individual terminals and for an individual addressing of the individual terminals. From the perspective of the external transmission network, the individual terminals present themselves as OPC-UA terminals.

In an invention embodiment, the individual terminals are in each case configured as a module in an I/O station. In the case of this invention embodiment, the individual terminals are thus not structurally separated, but are integrated in the I/O station.

It should furthermore be mentioned that the data connection between the gateway and the individual terminals can in each case have a local bus. This is advantageous in particular if the individual terminals are modules of an I/O station, as has been described above.

Figure 2:
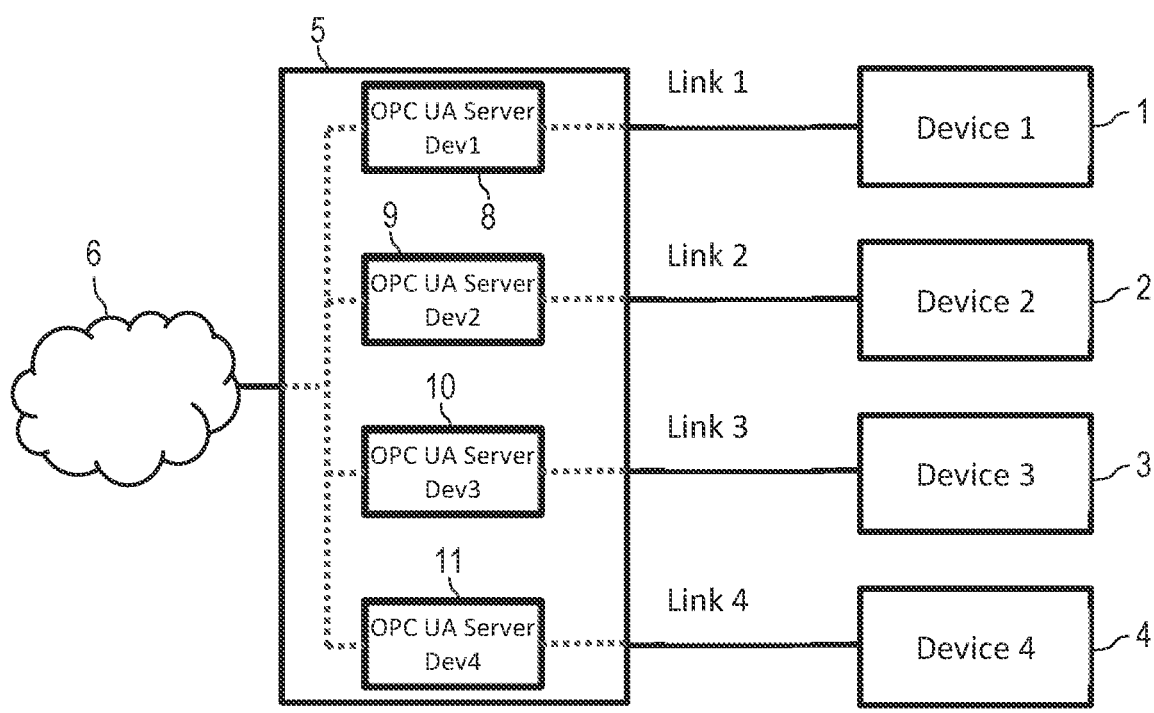
FIG. 2 shows a modification of the conventional network according to FIG. 1, wherein an OPC-UA server is in each case provided for each of the terminals.
Figure 3:
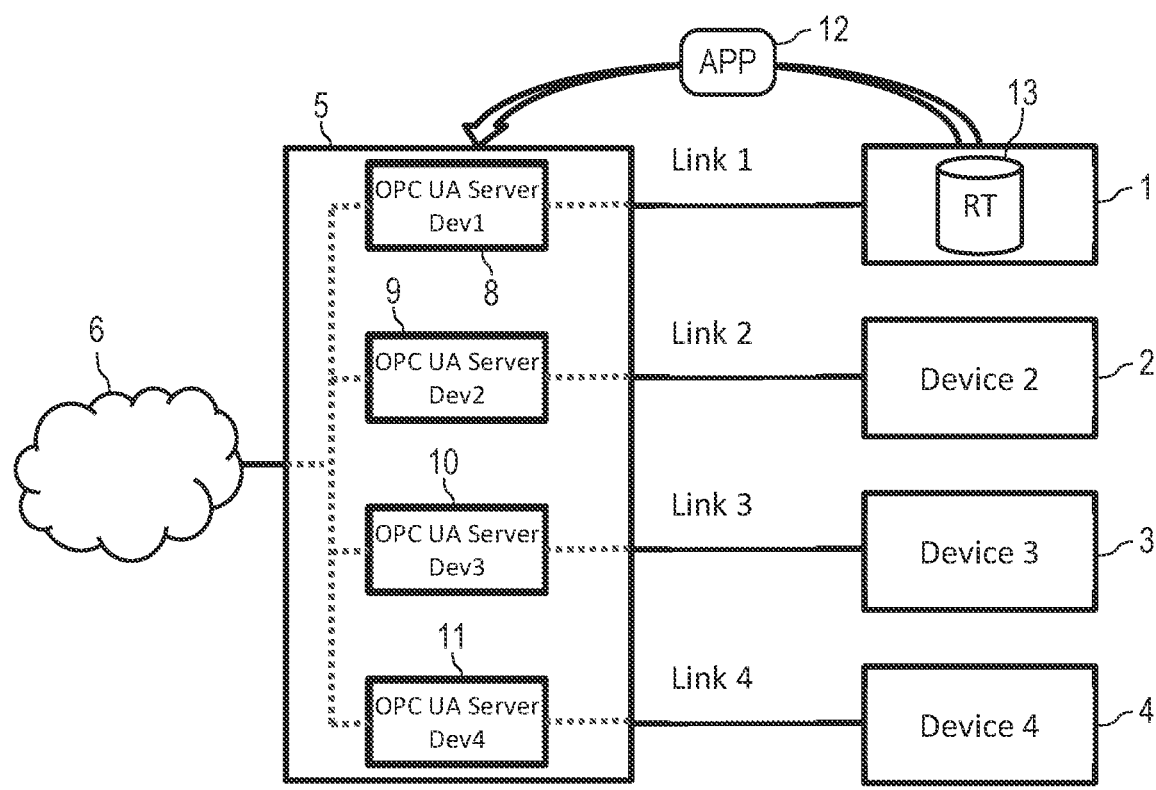
FIG. 3 shows a network according to the invention, in the case of which the software components for forming the OPC-UA servers in the gateway are loaded by the individual terminals.

FIG. 3 shoes a schematic illustration of a network according to the invention, which largely corresponds to the above-described conventional network illustrated in FIG. 2, so that, to avoid repetitions, reference is made to the above description relating to FIG. 2, wherein the same reference numerals are used for corresponding details.

A special feature of this exemplary embodiment according to the invention is that a software component 12, which is then loaded by the gateway 5 in order to form the corresponding OPC-UA server 8, is in each case stored in a program memory 13 the individual terminals 1-4.

To simplify matters, only the software component 12 for forming the OPC-UA server 8 is illustrated in the drawing. However, the other OPC-UA servers 9-11 are formed in the same way, in that a corresponding software component is loaded by the terminals 2-4.

Figure 4:
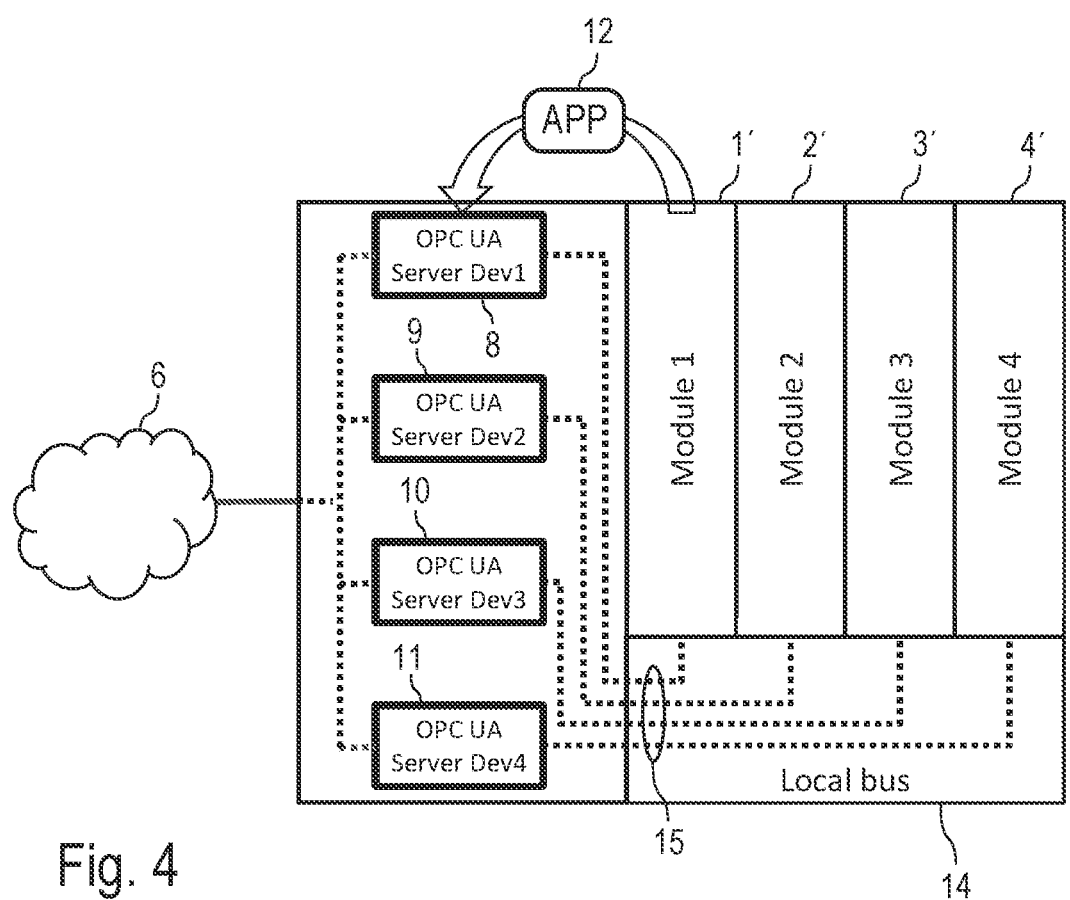
FIG. 4 shows a modification of FIG. 3, wherein the individual terminals are in each case modules in an I/O station.

FIG. 4 shows a modification of a network according to the invention, which partially corresponds to the above-described network according to the invention illustrated in FIG. 3, so that, to avoid repetitions, reference is made again to the above description, wherein the same reference numerals are used for corresponding details.

A special feature of this exemplary embodiment is that the terminals 1'-4' are configured as modules in a I/O station 14. The terminals 1'-4' are thus not structurally separated thereby but are integrated in the I/O station 14.

It should furthermore be mentioned that the communication between the OPC-UA servers 8-11 on the one hand and the terminals 1'-4' on the other hand takes place thereby via a local bus 15, which can be configured in a conventional manner.

In the case of this exemplary embodiment, the OPC-UA servers 8-11 are also formed in that the corresponding software component 12 is loaded from the corresponding terminal 1'.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1-4 Terminals
1'-4' Terminals
5 Gateway
6 External data transmission network
7 OPC-UA server
8-11 OPC-UA server
12 Software component for forming the OPC-UA servers
13 Program memory for software component
14 I/O station
15 Local bus
Link1-Link4 Data connection between gateway and terminals

The invention claimed is:

1. A network for data transmission, in particular in automation technology, comprising:
    a) a plurality of terminals,
    b) a common gateway for external connection of the network with the plurality of terminals to an external data transmission network,
    c) data connections between the common gateway and the individual terminals of the plurality of terminals, and
    d) a plurality of OPC-UA servers, wherein one of the plurality of OPC-UA servers is in each case assigned to the individual terminals, and individual OPC-UA servers communicate with corresponding terminals so that the individual terminals are addressable by the external data transmission network according to OPC-UA,
    e) wherein a software component, which is configured to create one of the OPC-UA servers, is in each case stored in the individual terminals, and
    f) wherein the common gateway loads the software components for creating the individual OPC-UA servers from the terminals and executes them in the common gateway.

2. The network according to claim 1,
    wherein the common gateway for communication with the individual terminals in each case has a port for the individual terminals, and
    wherein the common gateway loads the software component for creating the individual OPC-UA servers in a port-based manner, individually for each of the ports, so that one of the software components is in each case assigned to each of the ports.

3. The network according to claim 1, wherein the individual terminals are in each case TCP/IP-capable.

4. The network according to claim 1, wherein the individual OPC-UA servers in each case have a separate IP address in order to provide for an access from the external data transmission network to the individual terminals and for an individual addressing of the individual terminals.

5. The network according to claim 1, wherein the individual terminals for communication with the assigned OPC-UA servers in each case have one of the following data interfaces:
    a) Ethernet,
    b) I/O link according to EN 61131,
    c) Highway Addressable Remote Transducer (HART).

6. The network according to claim 1, wherein the terminals in each case include at least one sensor and/or at least one actuator.

7. The network according to claim 1, wherein the terminals are in each case a module in an I/O station.

8. The network according to claim 1, wherein the data connection between the common gateway and the individual terminals has a local bus.

* * * * *